(12) United States Patent
Kuo et al.

(10) Patent No.: US 6,369,923 B1
(45) Date of Patent: Apr. 9, 2002

(54) MULTIWAVELENGTH STABILIZATION WITH A SINGLE REFERENCE COMB FILTER IN DWDM SYSTEMS

(75) Inventors: Chien-Yu Kuo, Cupertino; Tai S. Chen, Sunnyvale; Niraj Gupta, Fremont, all of CA (US)

(73) Assignee: Cinta Corporation, San Jose, CA (US)

( * ) Notice: Subject to any disclaimer, the term of this patent is extended or adjusted under 35 U.S.C. 154(b) by 0 days.

(21) Appl. No.: 09/641,037

(22) Filed: Aug. 16, 2000

Related U.S. Application Data

(60) Provisional application No. 60/152,693, filed on Sep. 7, 1999, and provisional application No. 60/172,291, filed on Dec. 14, 1999.

(51) Int. Cl.[7] ................................................. H04J 14/02
(52) U.S. Cl. ...................................... 359/133; 359/187
(58) Field of Search ............................... 359/124, 133, 359/187; 372/32

(56) References Cited

U.S. PATENT DOCUMENTS

| | | | | |
|---|---|---|---|---|
| 4,861,136 A | | 8/1989 | Stone et al. ............... 350/96.3 |
| 5,299,212 A | * | 3/1994 | Koch et al. .................... 372/32 |
| 5,691,989 A | | 11/1997 | Rakuljic et al. ............... 372/20 |
| 5,745,275 A | * | 4/1998 | Giles et al. .................. 359/187 |
| 6,061,158 A | | 5/2000 | DeLong ....................... 359/133 |
| 6,204,945 B1 | * | 3/2001 | Iwata et al. ................. 359/124 |

* cited by examiner

Primary Examiner—Leslie Pascal
(74) Attorney, Agent, or Firm—Townsend and Townsend and Crew LLP

(57) ABSTRACT

The present invention provides for an optical transmission system for generating light signals at a plurality of predetermined wavelengths on an output fiber. The system has a plurality of modulated laser sources coupled to the output fiber and a feedback loop connected to the output fiber. The feedback loop includes a first subloop which generates electrical signals indicative of a total amount of light carried on the output fiber, and a second subloop which generates electrical signals indicative of an amount of light carried on the output fiber at the predetermined wavelengths. A control unit coupled to the plurality of laser sources receives the electrical signals from the first and second subloops and adjusts the laser source output wavelengths so that the output of each laser source is centered at one of the predetermined wavelengths. A comb filter is in the second subloop for transmitting light signals at the predetermined wavelengths.

26 Claims, 7 Drawing Sheets

MULTIWAVELENGTH STABILIZATION WITH A SINGLE REFERENCE COMB FILTER IN DWDM SYSTEMS

CROSS-REFERENCES TO RELATED APPLICATIONS

The present patent application claims priority from Provisional Patent Application Nos. 60/152,693, filed Sep. 7, 1999, and 60/172,291, filed Dec. 14, 1999, both of which are incorporated by reference herein.

BACKGROUND OF THE INVENTION

The present patent application is related to fiber optic networks, and, in particular, optical transmitters for WDM and DWDM network systems.

In WDM (Wavelength Division Multiplexing) fiber optic networks, optical signals are sent at predetermined wavelengths over optical fibers. Each predetermined wavelength forms a communication channel in the network and the wavelength (or frequency) of the optical signal is used to control the destination of the signal through the network. An advanced version of WDM networks is the DWDM (Dense Wavelength Division Multiplexing) network in which the number of wavelength channel is increased by reducing the channel wavelength separation. In DWDM networks, the communication channels are separated by 100 GHz, as set by the ITU (International Telecommunications Union) and the fiber optic industry is already assuming an unofficial channel separation of 50 GHz for advanced DWDM networks.

In passing, it should be noted that the term, WDM, is used to refer to both WDM and DWDM networks, unless indicated otherwise.

A challenge for WDM and DWDM networks is to ensure that the optical signals in one communication channel remain locked at that wavelength and much design effort has been spent in ensuring that the optical transmitters of a WDM system do not stray from their assigned channel wavelength. Heretofore, such efforts have required a channel wavelength reference element for each optical transmitter. Such wavelength reference elements are expensive and the number of channels in a typical WDM network system, eight or more, multiplies the costs for the element and the overall optical transmitter system. With the number of channels increasing and tighter wavelength channel separations, costs of conventional optical transmitter systems are expected to increase significantly.

The present invention is directed toward a wavelength stabilization system and method of operation which uses only one wavelength reference element. Hence the present invention provides for lower manufacturing costs for present WDM optical transmitters and in future systems as well.

SUMMARY OF THE INVENTION

The present invention provides for an optical transmission system for generating light signals at a plurality of predetermined wavelengths on an output fiber. The system has a plurality of modulated laser sources coupled to the output fiber and a feedback loop connected to the output fiber. Each laser source has an output for one of the predetermined wavelengths. The feedback loop includes a first subloop which generates electrical signals indicative of the total amount of light carried on the output fiber, and a second subloop which generates electrical signals indicative of the amount of light carried on the output fiber at the predetermined wavelengths. A control unit coupled to the plurality of modulated laser sources controls the output wavelength of each of the laser sources. The control unit receives the electrical signals from the first and second subloops and controls the laser source output wavelengths so that the output of each of the laser sources is centered at one of the predetermined wavelengths. A comb filter is in the second subloop for transmitting light signals at the predetermined wavelengths.

In another embodiment of the optical transmission system, the feedback loop includes a first filter tunable so as to controllably transmit light over the plurality of predetermined wavelengths; a first subloop generating electrical signals indicative of an amount of light transmitted by the first filter; and a second subloop generating electrical signals indicative of an amount of light transmitted by the first filter and and by a second filter having a transmission characteristics profile where the predetermined wavelengths fall upon the slopes of the transmission profile. The control unit coupled to the plurality of laser sources and to the first filter for tuning the first filter over the plurality of predetermined wavelengths receives the electrical signals from the first and second subloops and controls the laser source output wavelengths so that the output of each of the laser sources is centered at one of the predetermined wavelengths.

The present invention also provides for a method of generating light signals at a plurality of predetermined wavelengths on an output fiber in an optical transmission system. The system has a plurality of modulated laser sources each having an output for one of the predetermined wavelengths. The method includes tapping a portion of the light signals from the output fiber; dividing the portion into a first subportion and a second subportion; determining the amount of light in the first subportion; filtering the second subportion with the comb filter, determining an amount of light in the filtered second subportion; and controlling each of said laser sources so that the amount of power in the filtered second subportion is at a limit.

In another embodiment of the light signal generating method, the tapped portion from the output fiber is filtered to controllably transmit light over over the plurality of predetermined wavelengths and the filtered portion is divided into a first subportion and a second subportion. The amount of light in the first filtered subportion is determined. The second subportion is filtered with a comb filter which has transmission characteristics profile where the predetermined wavelengths fall upon the slopes of the transmission profile, the amount of light in the filtered second subportion is determined. The output wavelength of one of the laser sources is adjusted so that the amounts of light in the filtered first and second subportions are at a predetermined ratio to center the output of the one laser source at one of the predetermined wavelengths.

DESCRIPTION OF THE SPECIFIC EMBODIMENTS

Figure 1:
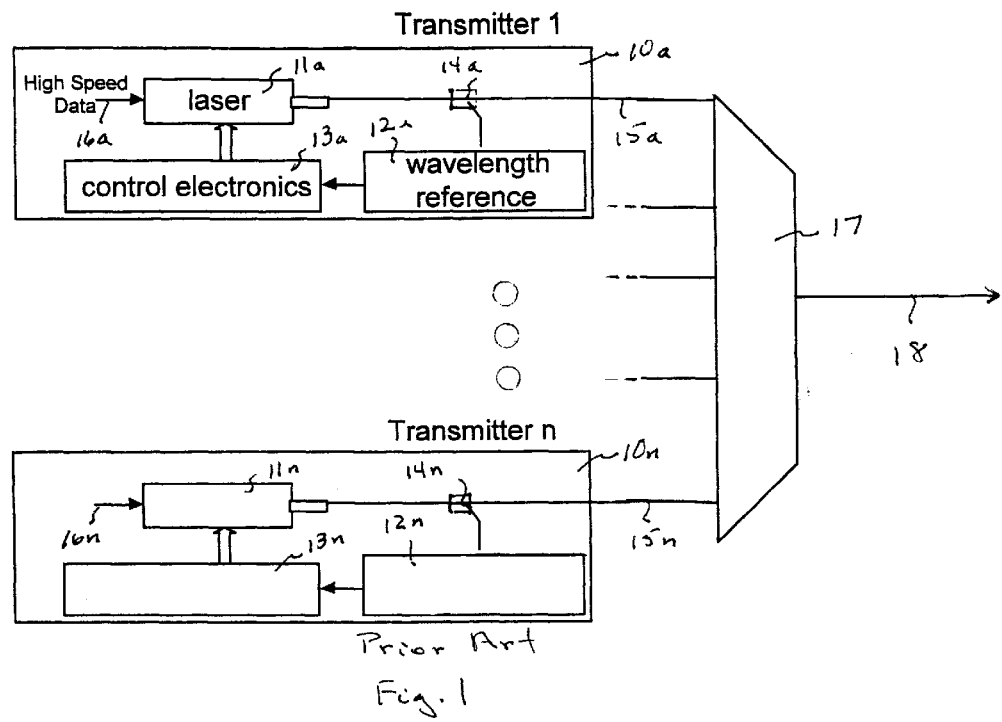
FIG. 1 is a block diagram of a conventional optical transmitter system found in current WDM networks.

FIG. 1 illustrates, in general, a conventional optical transmitter system which is found in current WDM networks. The system has a plurality of optical transmitters 10a–10n, each having an output at one of n wavelengths transmitted on optical fibers 15a–15n, respectively. The fibers 15a–15n are connected to a combiner 17, also called a WDM multiplexer, which combines the light signals received from the laser sources 10a–10n and places them on an output fiber 18. Each optical transmitter 10a–10n has a laser source 11a–11n, an electronic control unit 13a–13n, a wavelength reference unit 12a–13n, and an optical splitter 14a–14n. The optical transmitter 10a is described as representative of the other transmitters 10b–10n of the system. A laser source 11a sends its optical output at one of the ITU predetermined channel wavelengths on the optical fiber 15a. The output of the laser source 11a is modulated by high speed data signals received on an input line 16a. The modulation of the output of the laser source 11a is the information carried in the wavelength channel of the optical transmitter 10a.

A feedback loop formed by the optical splitter 14a, the wavelength reference unit 12a, and the electronic control unit 13a is used to lock, or stabilize, the output wavelength of the laser source 11a. Output signals of the laser source 11a are tapped by the optical splitter 14a which sends a small fraction of the output from the laser source 11a to the wavelength reference unit 12a, which is set to the selected ITU channel wavelength for the laser source 11a. The electrical control unit 12a monitors the laser source 11a through the wavelength reference unit 12a and sends control signals back to the laser source 11a when there is a deviation from the predetermined channel wavelength. Any departure from the predetermined channel wavelength is corrected so that the laser source 11a maintains its output signals at the desired wavelength.

Each of the optical transmitters 10a–10n has the same arrangement. Each of the wavelength reference units 12a–12n has an expensive wavelength reference element, which is typically a Bragg grating or an optical interference fitter. Each optical transmitter 10a–10n has its own wavelength reference element so that each added wavelength channel to the WDM network adds a significant cost.

Figure 2:
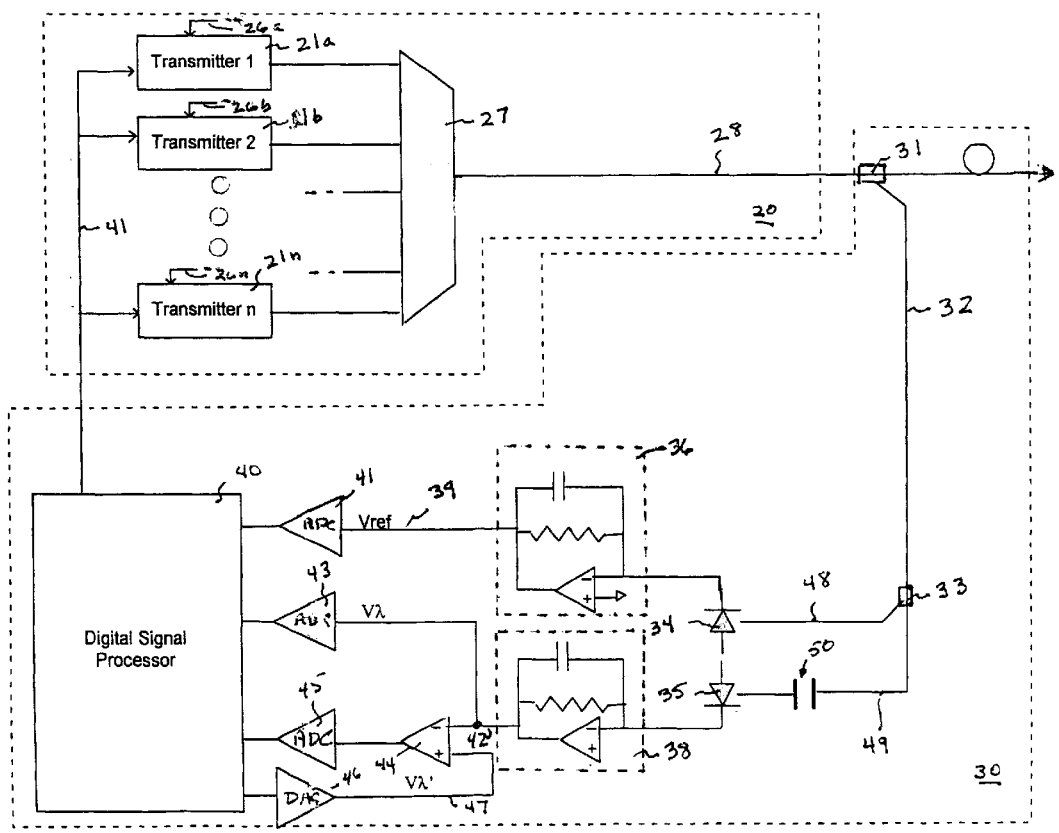
FIG. 2 is a block diagram of an optical transmitter system according to one embodiment of the present invention.

The present invention avoids these problems with an optical transmitter system having a single wavelength reference element. FIG. 2 illustrates the general organization of the optical transmitter system according to one embodiment of the present invention. The system is divided into a transmitter subsystem 20 and a control system 30. As in the system of FIG. 1, the FIG. 2 system has optical transmitters 21a–21n which each receive separate input signals on input lines 26a–26n respectively. The modulated output of the optical transmitters 21a–21n are united by a combiner 27 which places the output signals of all of the transmitters 21a–21n onto an output fiber 28. Each of the optical transmitters 21a–21n are controlled by a control bus 41 from the control section 30.

A fraction of the light, approximately 2–3%, on the output fiber 28 is tapped by an optical splitter 31, for the control section 30. The tapped portion of the output signals is carried by an optical fiber 32 and is split again by an optical splitter 33 to two optical fibers 48 and 49. The light signals in the fiber 48 are directed to a photodiode 34 and the light signals in the optical fiber 49 are directed to a photodiode 35 after being filtered by a comb filter 50. Different splitting ratios for the optical splitter 33 may be used and it can be assumed here that the light in the fiber 32 is split such that the insertion loss from the filter 50 is compensated for and that the photodiodes 34 and 35 receive equal power from the fibers 48 and 50. The photodiodes 34 and 35 generate output currents directly proportional to the amount of light at all wavelengths received by the photodiodes 34 and 35. The output currents are sent as input signals to transimpedance amplifiers 36 and 38 respectively, which provide for a conversion of the currents from the photodiodes 34 and 35 into voltage. The output voltage from the transimpedance amplifier 35 is a reference voltage, $V_{ref}$, which sent to an input terminal of an ADC (Analog-to-Digital Converter) 41, which sends its digital output to a digital signal processor 40. The output voltage $V_\lambda$ of the transimpedence amplifier 38 is sent to an ADC 43 which sends its digital output to the digital signal processor 40 also. The output of the transimpedence amplifier 38 is also sent to the negative input terminal of a high-gain, difference amplifier 44 which has its output terminal connected to an ADC 45. The output of the ADC 45 is connected to the digital signal processor 40. The positive input terminal of the amplifier 44 is connected to the output terminal of a DAC (digital-to-analog converter) 46 which has its input terminal connected to the digital signal processor 40.

Figure 3A:
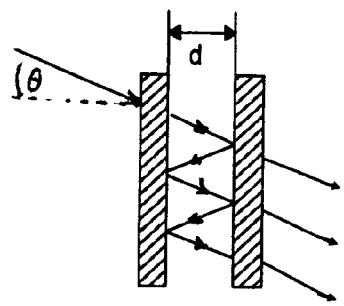
FIG. 3A is a representation of one type of reference comb filter used in the optical transmitter system of FIG. 2.
Figure 3B:
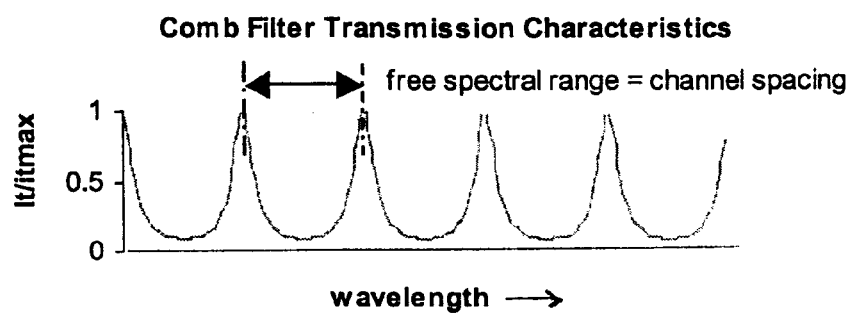
FIG. 3B is a graph plotting transmitted signal strength versus wavelength to illustrate the transmission characteristics of the comb filter in FIG. 3A.

The comb filter 50 is a Fabry-Perot interference filter, such as illustrated in FIG. 3A. Such a filter has two partially reflecting surfaces separated by a distance d and has a periodic transmission characteristic, which is illustrated in FIG. 3B and is described mathematically by an Airy function. Depending upon the angle of incidence θ and the distance d, the comb filter can be arranged so that the spacing of the transmission peaks of the light passing through the filter 50 is equal to the predetermined ITU channel spacing for WDM systems and aligned accordingly. That is, the comb filter characteristics profile is chosen such that the peaks of transmission lie exactly on the required channel wavelengths on which the transmitters should operate.

Operationally, the system of FIG. 2 has a small fraction of optical output power tapped off by the splitter 31, as stated previously. This light contains the wavelengths of all the channels which are being generated by the transmitters 21a–21n. The tapped-off light is again split by the optical splitter 33, the strength of which are measured by the two photodiodes 34 and 35. The photodiode 34 provides a measure of the optical power carried by the output fiber 28 and is used as a reference signal. On the other hand, the photodiode 35 measures the optical power of the light in the output fiber 28 after filtering by the comb filter 50. In other words, $V_\lambda$ generated from the output current of the photodiode 35 is proportional to the degree of coincidence of the wavelengths of the light in the output fiber 28 to the predetermined WAM channel wavelengths. The digital signal processor 40 compares the digitized versions of $V_{ref}$ and $V_\lambda$. Responsive to the comparison, the digital signal processor 40 also controls the wavelengths of each of the optical transmitters 21a–21n by means of the feedback control lines 41.

Figure 4:
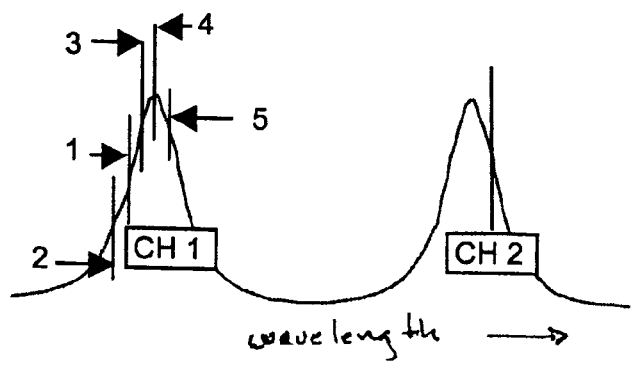
FIG. 4 is a plot of signal strength versus wavelength illustrating step mode operational steps of the system in FIG. 2.

Under normal operation, each of the optical transmitters 21a–21n has a constant optical output power and a constant wavelength. The processor 40 sequentially adjusts the wavelength of each of the optical transmitters 21a–21n by the control lines 41 to maximize the output power being detected by the photodiode 35. The wavelength of each optical transmitter 21a–21n is controlled in steps, first coarse and then fine, while monitoring the received signal $V_\lambda$. For example, assuming that the optical transmitter 21a is being controlled, the processor 40 sends signals along the control lines 41 to move the output wavelength of the transmitter 21a so that the signal $V_\lambda$ is increased. The wavelength of the optical transmitter 21a is moved toward a peak of the comb filter 50, as a consequence. It is assumed that the modulation is on-off keying and the data format is NRZ which is very widely used in optical communication networks. The optical power spectral density of such a signal is described by the $\text{sinc}^2$ function. The convolution of this spectrum with the comb filter characteristics, representing the power incident on photodiode 35, is a maximum when the center wavelength of the laser coincides with the peak of the comb filter transmission characteristics. This incident power on the photodiode 35 decreases as the center wavelength of the laser moves away from this point in either direction. All modulation formats with this property work equally well with the techniques described here. As the detected signal goes past the peak, the processor 40 detects a drop in $V_\lambda$ and then moves the wavelength a step back to place it near the peak. FIG. 4 illustrates a situation where the starting wavelength for that particular channel is at position 1. The processor takes a coarse step to the left to position 2, but since the $V_\lambda$ decreases, the processor 40 reverses direction and then moves stepwise through positions 1, 3, 4 in succession to achieve increasing $V_\lambda$. Continuing to position 5, a decrease in $V_\lambda$ is detected which indicates that the peak has passed. The processor 40 then moves back a step to position 4 which is at the peak. Note that the other transmitters 21b–21n are held constant.

Because the accuracy with which the peak may be determined is dependent upon the step size and the corresponding change in $V_\lambda$, the present invention then uses fine step changes in the wavelength. The high-gain differential amplifier 44 which is connected to the ADC 45 and DAC 46, as described above, is used for these operations. When the output of the optical transmitter 21a is near a peak of the comb filter 50 (typically indicated by a drop after increasing $V_\lambda$, as explained in the example above), the processor 40 samples the voltage $V_\lambda$ at that point and with the DAC 46 generates a reference DC voltage, $V_\lambda'$, which is nearly equal to $V_\lambda$. This reference DC voltage $V_\lambda'$ is passed to the positive terminal of the high-gain, differential amplifier 44. With this voltage constant, the wavelength of the optical transmitter 21a is adjusted in very small increments, i.e., in fine steps with the output from the high-gain, differential amplifier 44 providing a very precise location of the peak. Using a commercial comb filter, such as Model WL5000, produced by JDS Uniphase of Nepean, Ontario, Canada, and of San Jose, Calif., accuracy of ±0.1 GHz has been achieved.

Figure 5A:
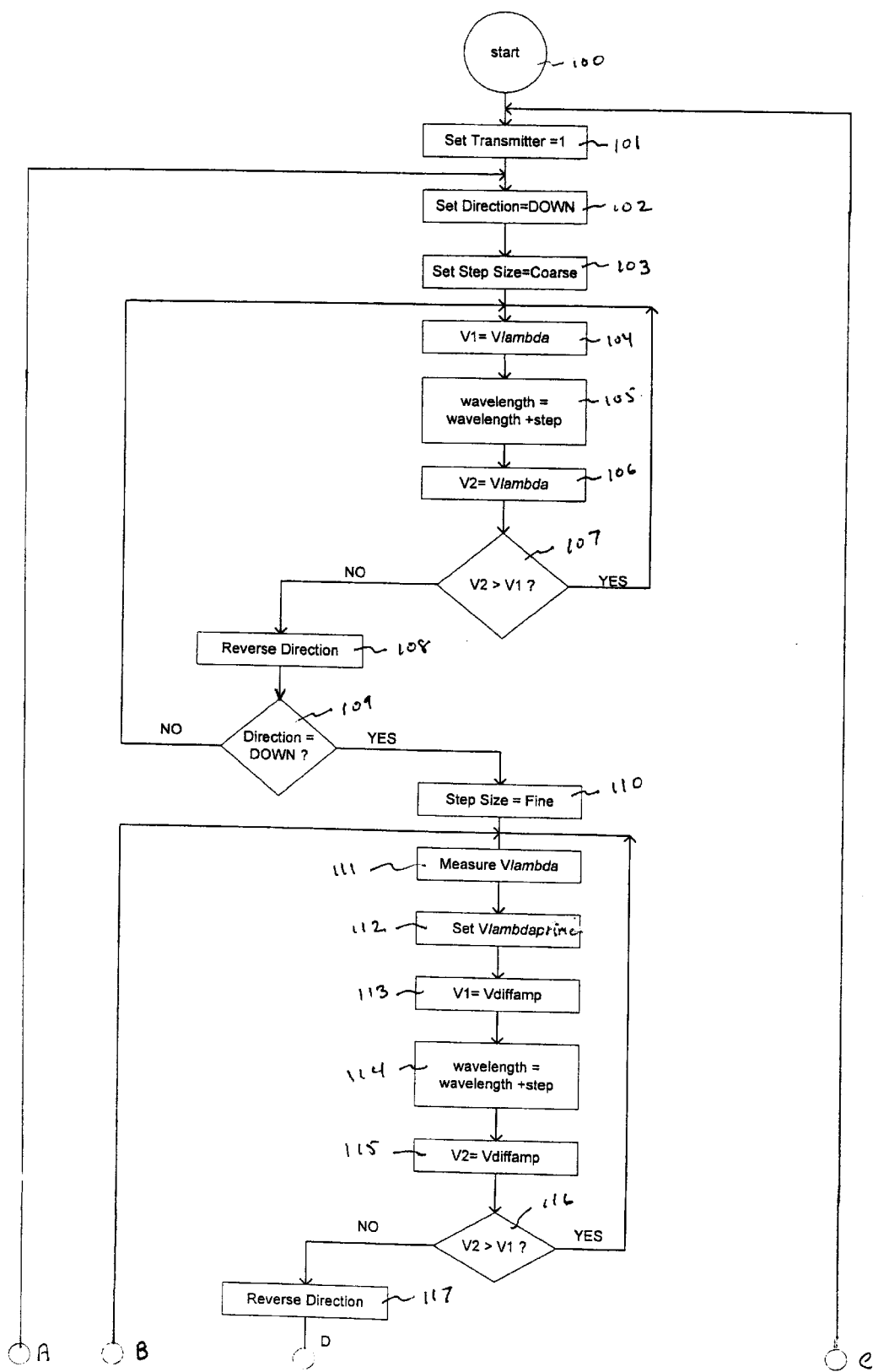
FIGS. 5A and 5B illustrate a flow chart of step mode operational steps of the system in FIG. 2.
Figure 5B:
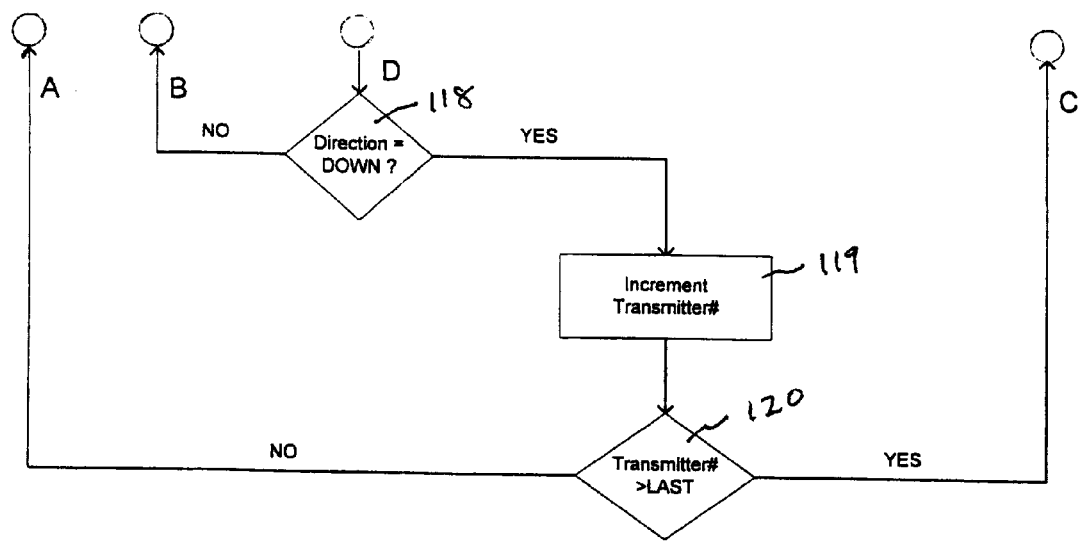

The digital signal processor 40 proceeds to operate in this manner on all the other optical transmitters 21b–21n so that all of these transmitters 21a–21n are placed at the peaks of the transmission comb filter 50. FIGS. 5A and 5B display a flow chart of these step mode operations. After the initial step 100, the first optical transmitter is selected for adjustment by step 101; an arbitrary initial direction ("down") of the step change in wavelength is selected by step 102; and the size of the initial step (coarse) is selected by step 103. Steps 104–107 handle the comparison of $V_\lambda$ before and after the step change in wavelength is made. If the comparison in step 107 indicates that the output $V_\lambda$ has increased with the change in wavelength, the tuning operation returns to step 104. Another step change in the same direction is made and $V_\lambda$ before and after the next step change in wavelength is compared. If the comparison in step 107 indicates that the output $V_\lambda$ has increased with the change in wavelength, the tuning operation again returns to step 104. In this manner, looping through steps 104–107 provides for stepped changes in the output wavelength toward a maximum in one direction. On the other hand, if $V_\lambda$ has decreased with the change in wavelength indicative of moving away from a wavelength peak, the direction of the wavelength step change is reversed by step 108 and the direction of the step change is determined by step 109.

If the direction of step change is not "down," then tuning process returns to step 104 also to provide a stepped change in the output wavelength toward the maximum in the opposite direction.

On the other hand, if the step change direction is "down" at step 109, the size step is set to "fine" in step 110 and the tuning process now tunes the optical transmitter in fine steps. The output $V_\lambda$ is sampled in step 111 and set to generate a reference voltage $V_\lambda'$ for the high-gain, differential amplifier 44 in step 112. Then the output of the differential amplifier 44 is used to compare the output from the optical transmitter before and after the fine step change in wavelength is made, in steps 113–116. If the comparison in step 116 indicates that the output of the differential amplifier 44 has increased with the change in wavelength, the process returns to step 111 and the new $V_\lambda$ is sampled and set as a reference voltage for the differential amplifier 44 again in step 112. The comparison of differential amplifier output before and after the next step change in wavelength is made again in steps 113–116. In this manner, looping through steps 113–116 provides for fine stepped changes in the output wavelength toward a maximum in one direction.

On the other hand, if the output of the differential amplifier 44 has decreased with the change in wavelength, the direction of the wavelength step change is reversed by step 117 and the direction of the step change is determined by step 118. If the direction of step change is not "down," then the tuning process returns to step 111 (and steps 112–116) to provide for fine stepped changes toward the maximum in the opposite direction.

If, at step 118, the step change direction is "down," then the tuning process ends for the initial optical transmitter and proceeds to the next optical transmitter by the incrementing step 119. Step 120 determines if the incrementing step 119 exceeds the number of optical transmitters 21a–21n in the system. If so, the tuning process has sequentially tuned all the optical transmitters 21a–21n in the system and returns to step 101 to start the tuning process all over again. If not, the process continues to step 102 and the tuning process continues with the next optical transmitter.

It should be noted that in the description above, it is assumed that the power from each of the optical transmitters 21a–21n does not vary as the wavelength is varied. This assumption is correct for small changes, such as when the wavelength is adjusted by very small amounts around the transmission peaks of the comb filter 50. In case the power variations must be taken into account, changes in $V_{ref}$ can be monitored and factored out of $V_\lambda$ to arrive at optical fluctuations that are purely a function of wavelength.

$$V_\lambda' = V_\lambda * [V_{ref1}/V_{ref2}]$$

where $V_{ref1}$ is $V_{ref}$ before the wavelength change $V_{ref2}$ is $V_{ref}$ after the wavelength change, and $V_\lambda'$ is the corrected output $V_\lambda$.

Figure 6A:
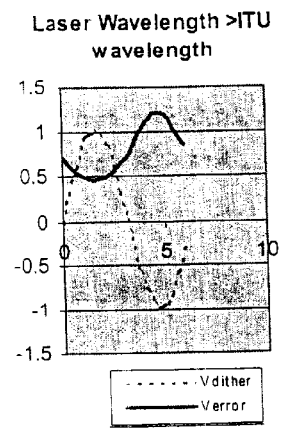
FIG. 6A shows the resulting output as a representative laser source is dithered about a wavelength greater than a selected ITU channel wavelength.
Figure 6B:
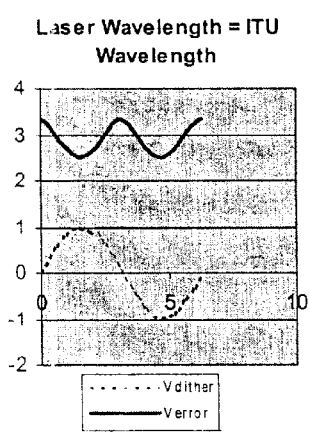
FIG. 6B illustrates the representative output when the laser source is dithered about the wavelength which is equal to the selected ITU channel wavelength.
Figure 6C:
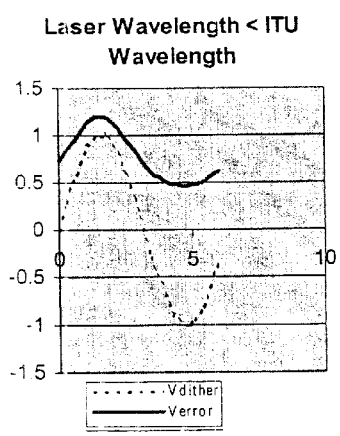
FIG. 6C illustrates the resulting output as the laser output is dithered about a wavelength less than the selected ITU channel wavelength.

An alternative operation to the stepping algorithm described above is to dither the output wavelength of the selected optical transmitter 21a–21n continuously around the current operating wavelength of the optical transmitter. Different driving functions at relatively low frequencies for the dithering may be used. In the case of a sinusoidal dither signal, the wave forms illustrated in FIGS. 6A–6C, are obtained for different values of the operating wavelength of the optical transmitter. If the operating wavelength is sufficiently removed from a transmission peak of the comb filter 50, i.e., greater than 1 GHz, then the signal $V_\lambda$ has the same fundamental frequency as a dither signal as illustrated in FIGS. 6A and 6C. The two signals are out of phase if the operating wavelength is greater than the selected channel peak and in phase if the operating wavelength is less than the selected channel peak. When the operating wavelength is exactly at the channel peak of the comb filter 50, the $V_\lambda$ signal has a frequency twice that of the dither signal. This is illustrated in FIG. 6B. Furthermore, $V_\lambda(V_{ditherpeak}+) = V_\lambda(V_{ditherpeak}-)$, i.e., the values of the $V_{80}$ signal at the positive and negative peaks of the dither signals are equal. This is used as the target condition for closed loop operations. The correction signal applied to the selected optical transmitter 21a21n moves the operating wavelength of the optical transmitter to the peak of the comb filter 50 by the following signal:

$$V_{correction} [V_\lambda(V_{ditherpeak}+) - V_\lambda(V_{ditherpeak}-)]$$

When the operating wavelength is at the transmission peak of the comb filter 50, the correction signal is 0 and the selected optical transmitter 21a–21n is left to continue to operate at this point.

Figure 7:
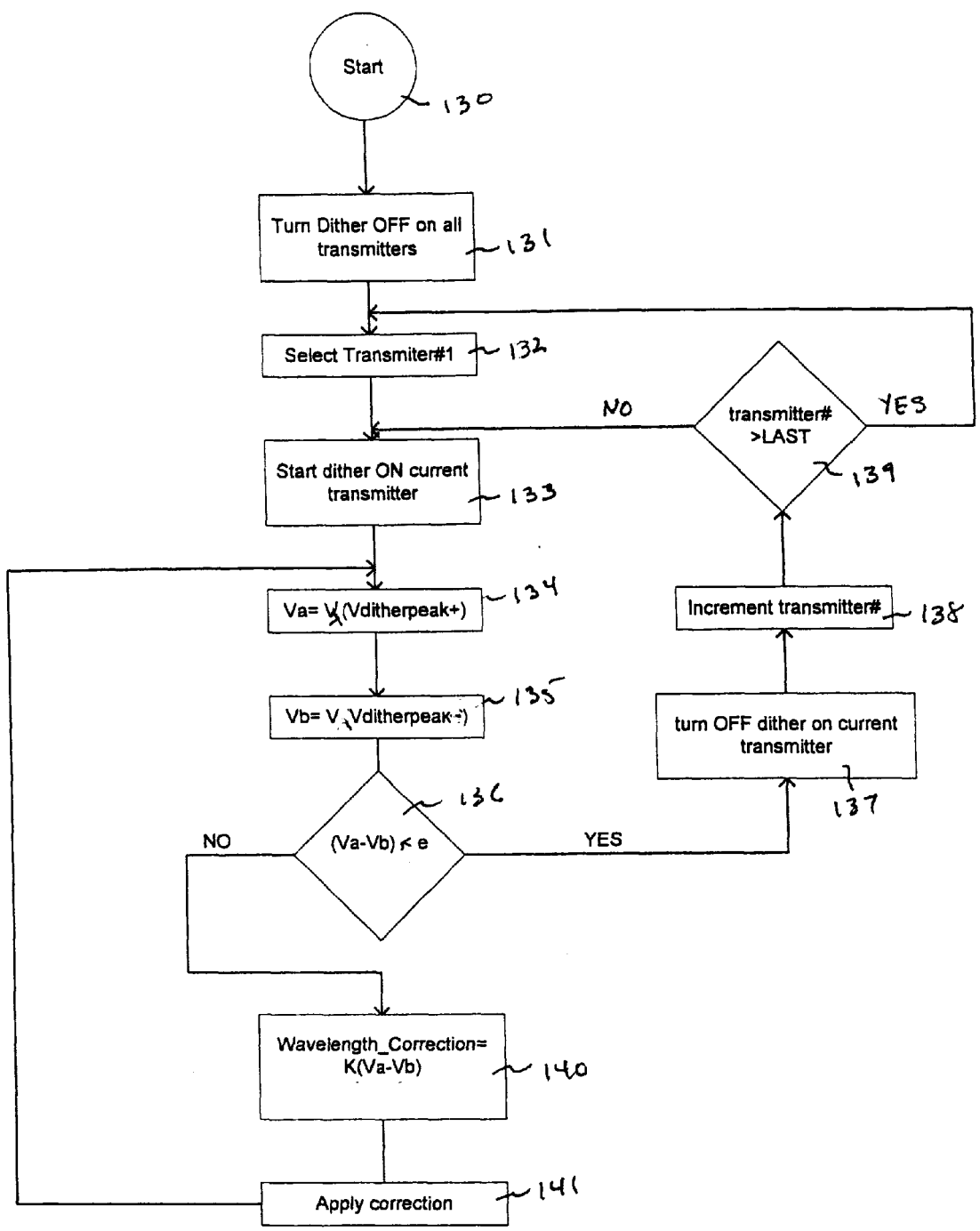
FIG. 7 illustrates of a flow chart of dithering operational steps of the system of FIG. 2.

A flow chart of such dithering operations is illustrated in FIG. 7. After an initial step 130, all dithering of the optical transmitters 21a–21n are initially turned off by step 131. Then the first optical transmitter 21a is selected in step 132 and its dithering operation is turned on in step 133. As the output wavelength of the optical transmitter 21a is dithered, its output Va for the maximum change in wavelength in one direction, $V_\lambda(ditherpeak+)$, determined by step 134 and its output Vb for the maximum change in wavelength in other direction, $V_\lambda(ditherpeak-)$, determined by step 135. By step 136, a determination is made whether the difference between Va and Vb is less or greater than a predetermined amount e. If the difference is greater than e, then a wavelength correction is made to the current operating wavelength of the optical transmitter 21 so that the resulting output $V_\lambda$ is changed by $V_{correction} = K * [V_\lambda(V_{ditherpeak}+) - V_\lambda(V_{ditherpeak}-)]$, where K is a proportionality constant, by step 141 after $V_{correction}$ is determined by step 140. The process then returns back to step 134. The dithering operation continue for the current optical transmitter.

If, at step 136, the difference between Va and Vb is less than e, indicating that operating wavelength is sufficiently close to the desired peak of the comb filter 50, the dithering operation of the current optical transmitter is terminated by step 137 and the next optical transmitter is selected by the incrementing step 138. Step 139 determines whether the next selected optical transmitter exceeds the number of optical transmitters 21a–21n in the system. If so, then the process starts over again by step 132 and the dithering operation of the first optical transmitter is started again. If not, then the process moves back to step 133 to start the dithering operations of the next optical transmitter. In this manner, the output wavelengths of each of the optical transmitters 21a–21n are continuously updated.

The dithering technique can be further extended by simultaneously dithering each of the optical transmitters 21a–21n at a different frequency. The resulting output signal containing the composite error signatures of all the optical transmitters is then processed to stabilize all the transmitters simultaneously. The composite error (dithered) signal is the sum of the individual error (dithered) signals. The individual error signals are extracted by means of a digital filter implemented in firmware. Vditherpeak+ and Vditherpeak– are obtained from this filtered signal for each optical transmitter 21a–21n. The correction signals for each of the optical transmitters are then calculated and applied.

Figure 9:
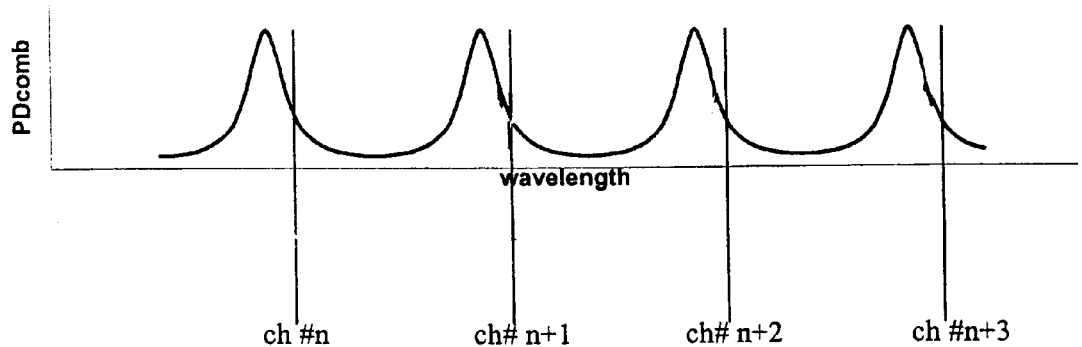
FIG. 9 is a plot of signal strength versus wavelength illustrating the location of the ITU channel wavelengths against the transmission curve of the comb filter of the system of FIG. 8.
Figure 8:
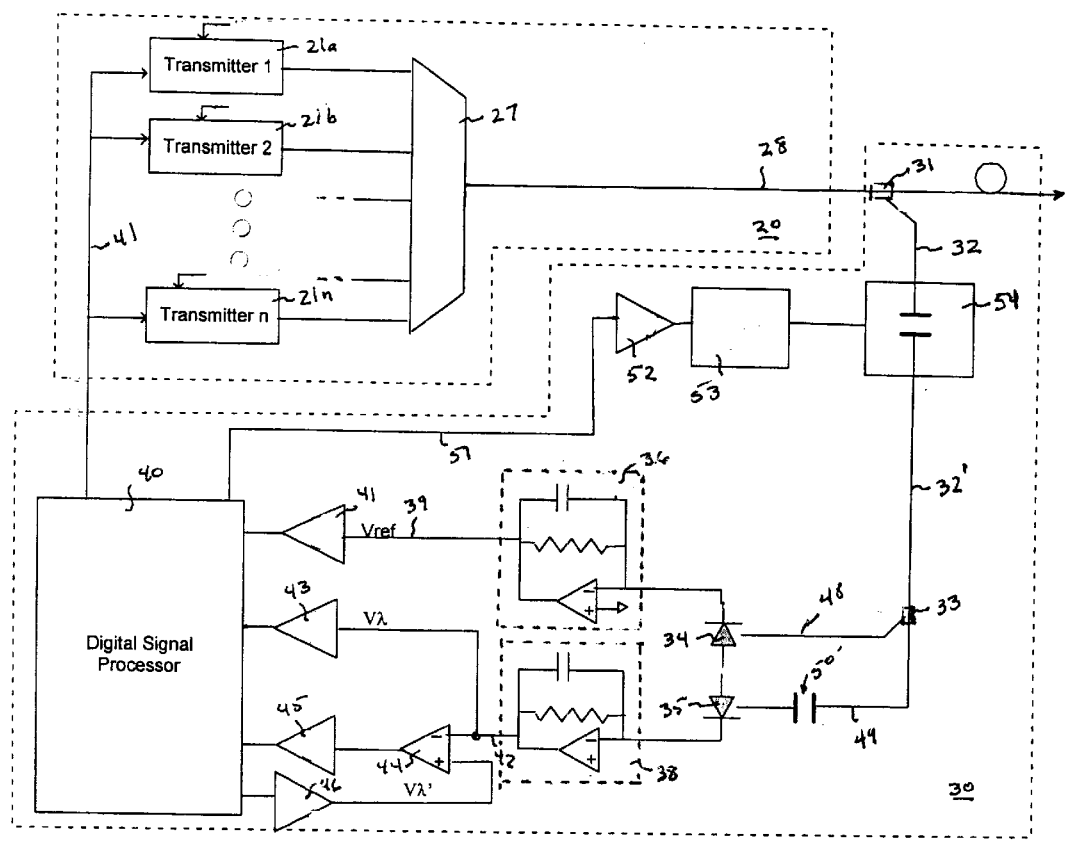
FIG. 8 is a block diagram of an optical transmitter system according to another embodiment of the present invention.

FIG. 8 illustrates an optical transmitter system according to another embodiment of the present invention. The optical transmitter system of FIG. 8 is similar to that illustrated in FIG. 2 and many of the same reference numerals are used for similar elements in FIGS. 2 and 8. However, a difference is that the system of FIG. 8 has an additional optical tunable filter 54 to operate on the light tapped off by the optical splitter 31. The tunable filter 54, such as Model No. MT-15-025-1 from Coretek in Wilmington, Mass., is controlled by a filter drive circuit 53 which responds to analog control signals from a DAC 52. The digital signal processor 40 sends digital signals to the DAC 52 to control the tunable filter 54 which is swept over the entire transmission wavelength range. The filter 54 has a passband which is smaller than the wavelength grid spacing. A comb filter 50' is selected so that the desired ITU channel wavelengths fall on the slopes of the transmission profile of the comb filter 50', as illustrated in FIG. 9. That is, the passbands of the filter 50' are slightly displaced from the ITU wavelengths at which the optical transmitters should ideally have their output wavelengths. The splitter 33 is chosen such that when the transmitter wavelength is exactly on the ITU wavelength grid, then $V_{ref}$ is equal to $V_\lambda$. Any deviation from this wavelength increases or decreases the ratio of $V_{ref}/V_\lambda$. This information is used to generate a correction control signal to move the wavelength to the correct position. The digital signal processor 40 sweeps the tunable filter 54 across the entire ITU wavelength range for the system while capturing the signals $V_{ref}$ and $V_\lambda$ for each of the optical transmitters 21a–21n.

Figure 10:
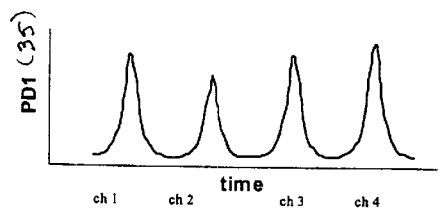
FIG. 10 represents the output of photodiodes in the optical transmitter system in FIG. 8.
Figure 10:
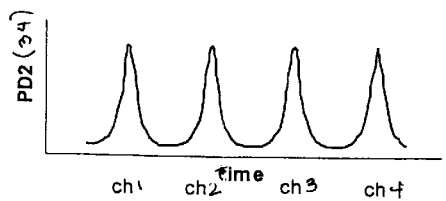

FIG. 10 shows the output for four of the wavelength channels for the photodiodes 35 and 34 of FIG. 8. A comparison of the strengths of the signals from the two photodiodes 35 and 34 indicates the location of the operating wavelength with respect to the selected ITU channel wavelength. For example, for channels 1 and 3, the ratio $V_\lambda/V_{ref}$ is 1, which indicates that the two channels are at the correct wavelength. For channel 2, the ratio $V_\lambda/V_{ref}$ is less than 1 which is indicative of a deviation towards a longer wavelength. On the other hand, channel 4 has $V_\lambda/V_{ref}$ greater than 1 which indicates a wavelength deviation towards a shorter wavelength. The processor 40 supplies the optical transmitters 21a–21n which are deviating from the channel wavelength with correction signals so that the operating wavelengths are moved back to the desired channel wavelength. This operation has the advantage of being faster, as well as requiring simpler signal processing than the operation described previously.

The above operations show how the wavelengths of multiple optical transmitters can be stabilized with only one single reference device. Not only does it provide significant cost and space savings, but because of its compactness, it is possible to implement a redundant stabilizing system consisting of two independent wavelength control modules.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. An optical transmission system for generating light signals at a plurality of predetermined wavelengths on an output fiber, said system comprising
    a plurality of modulated laser sources coupled to said output fiber, each laser source having an output for one of said predetermined wavelengths;
    a feedback loop connected to said output fiber and said plurality of laser sources, said feedback loop having
        a first subloop generating electrical signals indicative of an amount of light carried on said output fiber;
        a second subloop generating electrical signals indicative of a total amount of light carried on said output fiber at said predetermined wavelengths; and
        a control unit coupled to said plurality of laser sources for controlling an output wavelength of each of said laser sources, said unit receiving said electrical signals from said first and second subloops and controlling said laser source output wavelengths so that the output of each of the laser sources is centered at one of the predetermined wavelengths.

2. The optical transmission system of claim 1 wherein said second loop includes a comb filter for transmitting light signals at said predetermined wavelengths.

3. The optical transmission system of claim 2 wherein said comb filter comprises a Fabry-Perot interferometric device.

4. The optical transmission system of claim 2 wherein said first subloop comprises
    a first photodiode receiving light indicative of said total amount of light carried on said output fiber and generating a first output current proportional to said amount of light;
    a first amplifier connected to said first photodiode and generating a first voltage proportional to said first output current; and
    a first ADC connected to said first amplifier and converting said first voltage into digital electrical signals for said control unit.

5. The optical transmission system of claim 4 wherein said second subloop comprises
    a second photodiode connected to said comb filter receiving light indicative of said amount of light carried on said output fiber at said predetermined wavelengths and generating a second output current proportional to said amount of light;
    a second amplifier connected to said second photodiode and generating a second voltage proportional to said second output current; and
    a second ADC connected to said second amplifier and converting said second voltage into digital electrical signals for said control unit.

6. The optical transmission system of claim 1 wherein said control unit controls said output wavelength of each one of said laser sources sequentially in step mode so as to maximize output of each laser source at one of said predetermined wavelengths.

7. The optical transmission system of claim 6 wherein said step mode includes coarse and fine steps.

8. The optical transmission system of claim 6 wherein said control unit controls said output wavelength of each of said laser sources to accommodate power variations in said laser sources.

9. The optical transmission system of claim 1 wherein said control unit controls said output wavelength of each one of said laser sources sequentially by dithering said output wavelength so as to maximize output of each laser source at one of said predetermined wavelengths.

10. The optical transmission system of claim 1 wherein said control unit simultaneously dithers said output wavelengths of each one of said laser sources at a different frequency.

11. An optical transmission system for generating light signals at a plurality of predetermined wavelengths on an output fiber, said system comprising
    a plurality of modulated laser sources coupled to said output fiber, each laser source having an output for one of said predetermined wavelengths;
    a feedback loop connected to said output fiber and said plurality of laser sources, said feedback loop having
        a first filter tunable so as to controllably transmit light over said plurality of predetermined wavelengths;
        a first subloop generating electrical signals indicative of an amount of light transmitted by said first filter;
        a second subloop generating electrical signals indicative of an amount of light transmitted by said first filter and by a second filter having a transmission characteristics profile so that said predetermined wavelengths falls upon slopes of said transmission profile; and
    a control unit coupled to said plurality of laser sources for controlling an output wavelength of each of said laser sources and coupled to said first filter for tuning said first filter over said plurality of said predetermined wavelengths, said control unit receiving said electrical signals from said first and second subloops and controlling said laser source output wavelengths so that the output of each of the laser sources is centered at one of said predetermined wavelengths.

12. The optical transmission system of claim 11 wherein said first filter has a passband more narrow than spacings between said predetermined wavelengths.

13. The optical transmission system of claim 11 wherein said second filter comprises a comb filter.

14. The optical transmission system of claim 13 wherein said comb filter comprises a Fabry-Perot interferometric device.

15. The optical transmission system of claim 13 wherein said first subloop comprises
    a first photodiode receiving light indicative of an amount of light transmitted by said first filter and generating a first output current proportional to said amount of light;

a first amplifier connected to said first photodiode and generating a first voltage proportional to said first output current; and a first ADC connected to said first amplifier and converting said first voltage into digital electrical signals for said control unit.

16. The optical transmission system of claim 15 wherein said second subloop comprises a second photodiode connected to said comb filter receiving generating electrical signals indicative of an amount of light transmitted by said first filter and at one of said predetermined wavelengths and generating a second output current proportional to said amount of light;

a second amplifier connected to said second photodiode and generating a second voltage proportional to said second output current; and a second ADC connected to said second amplifier and converting said second voltage into digital electrical signals for said control unit.

17. The optical transmission system of claim 11 wherein said control unit adjusts said output wavelength of each of said laser sources responsive to a ratio of said amount of light transmitted by said first filter, and said amount of light transmitted by said first filter and said second filter.

18. A method of generating light signals at a plurality of predetermined wavelengths on an output fiber in an optical transmission system, said system having a plurality of modulated laser sources each having an output for one of said predetermined wavelengths, said method comprising tapping a portion of said light signals from said output fiber;

dividing said portion into a first subportion and a second subportion;

determining an amount of light in said first subportion;

filtering said second subportion with a comb filter, said comb filter filtering light signals at said predetermined wavelengths;

determining an amount of light in said filtered second subportion; and adjusting an output wavelength of each of said laser sources so that said amount of power in said filtered second subportion is at a limit with respect to said first output.

19. The method of claim 18 wherein said limit is a maximum.

20. The method of claim 18 wherein said laser source controlling step comprises sequentially adjusting said output wavelength of each laser source so that said output wavelength is at a maximum while holding output wavelengths of other laser sources constant.

21. The method of claim 20 wherein said adjusting step comprises adjusting said output wavelength of said laser source in a sequence of steps.

22. The method of claim 21 wherein said sequence of steps includes coarse and fine steps.

23. The method of claim 20 wherein said adjusting step comprises adjusting said output wavelength of said laser source by dithering said output so that said output wavelength is at a maximum.

24. A method of generating light signals at a plurality of predetermined wavelengths on an output fiber in an optical transmission system, said system having a plurality of modulated laser sources each having an output for one of said predetermined wavelengths, said method comprising tapping a portion of said light signals from said output fiber;

filtering said portion to controllably transmit light over said plurality of predetermined wavelengths;

dividing said filtered portion into a first subportion and a second subportion;

determining an amount of light in said first filtered subportion;

filtering said second subportion with a comb filter, said comb filter having transmission characteristics profile so that each of said predetermined wavelengths falls upon slopes of said transmission peak profile;

determining an amount of light in said filtered second subportion; and adjusting an output wavelength of one of said laser sources so that said amounts of power in said filtered first and second subportions are at a predetermined ratio to center said output of said one laser source at one of said predetermined wavelengths.

25. The method of claim 24 wherein said filtering said portion step is performed sequentially over each one of said predetermined wavelengths; and said output wavelength adjusting step is performed sequentially so that said amounts of power in said filtered first and second subportions are at a predetermined ratio to center outputs of said laser sources at each one of said predetermined wavelengths.

26. The method of claim 24 wherein said filtering said portion step comprises adjusting a tunable filter.

* * * * *